US007690506B2

(12) United States Patent
Ordonez et al.

(10) Patent No.: US 7,690,506 B2
(45) Date of Patent: Apr. 6, 2010

(54) AIRCRAFT BRAKE ASSEMBLY CONTAINER AND METHOD OF USING SAME

(75) Inventors: Jose Ordonez, Canyon Country, CA (US); Neil Waldron, Valencia, CA (US)

(73) Assignee: Bill Thomas Associates, Inc., Valencia, CA (US)

( * ) Notice: Subject to any disclaimer, the term of this patent is extended or adjusted under 35 U.S.C. 154(b) by 539 days.

(21) Appl. No.: 11/432,539

(22) Filed: May 12, 2006

(65) Prior Publication Data

US 2007/0261979 A1 Nov. 15, 2007

(51) Int. Cl.
*B65D 85/02* (2006.01)
(52) U.S. Cl. ........................ 206/408; 206/303; 206/319; 220/4.24
(58) Field of Classification Search ................. 206/319, 206/408, 303, 304, 304.1, 404, 445, 446, 206/468, 191, 758, 317, 3; 220/4.22–4.24, 220/1.5
See application file for complete search history.

(56) References Cited

U.S. PATENT DOCUMENTS

| 2,613,807 | A | * | 10/1952 | Higbee | 206/319 |
|---|---|---|---|---|---|
| 2,708,509 | A | * | 5/1955 | Gould et al. | 220/4.22 |
| 2,728,581 | A | | 12/1955 | Goebert | |
| 2,858,014 | A | * | 10/1958 | Koziol | 220/4.24 |
| 2,982,395 | A | * | 5/1961 | Rados | 206/319 |
| 3,198,418 | A | | 8/1965 | Rupp | |
| 3,762,600 | A | * | 10/1973 | Kreutzweiser | 220/4.24 |
| 3,982,651 | A | * | 9/1976 | Braun et al. | 220/4.21 |
| 4,027,794 | A | * | 6/1977 | Olson | 206/446 |
| 4,033,454 | A | * | 7/1977 | Santoni | 206/597 |
| 4,034,926 | A | | 7/1977 | Wegner | |
| 4,109,790 | A | | 8/1978 | Gottschlich | |

(Continued)

FOREIGN PATENT DOCUMENTS

DE 4136268 5/1993

*Primary Examiner*—Ehud Gartenberg
*Assistant Examiner*—Andrew Perreault
(74) *Attorney, Agent, or Firm*—Tangent Law Group; Eric J. Weierstall, Esq.

(57) ABSTRACT

An aircraft brake assembly container and a method for using an aircraft brake assembly in servicing an aircraft, with the container having at least two identical container portions, at least one of the at least two container portions having an at least one sliding channel therein, an at least one cradle member having an at least one sliding portion engaging with the at least one sliding channel, and at least one securement device securing the at least two identical container portions. The method having the method steps of transporting an aircraft brake assembly container to the aircraft undercarriage, the container comprising at least two container portions, with a first of the at least two container portions supporting a new brake assembly; opening the container, rotating a second of the at least two container portions; aligning the second of the at least two container portions with the aircraft undercarriage and a used aircraft brake assembly; releasing the used aircraft brake assembly into the second of the at least two container portions; removing the second of the at least two container portions along with the used aircraft brake assembly; aligning the first of the at least two container portions with the aircraft undercarriage; installing the new brake assembly; and replacing the first of the at least two container portions atop the second of the at least two container portions.

8 Claims, 7 Drawing Sheets

U.S. PATENT DOCUMENTS

| | | | |
|---|---|---|---|
| 4,139,093 A * | 2/1979 | Holmes | 206/445 |
| 4,151,914 A | 5/1979 | Blatt | |
| 4,305,508 A * | 12/1981 | Rodgers | 206/319 |
| 4,412,615 A * | 11/1983 | Forshee | 206/319 |
| 4,735,310 A * | 4/1988 | Lemery et al. | 206/319 |
| 4,765,500 A | 8/1988 | Ingram | |
| 4,790,430 A * | 12/1988 | Thomas | 206/303 |
| 4,901,855 A * | 2/1990 | Furukawa | 206/446 |
| 5,048,679 A * | 9/1991 | Thomas | 206/303 |
| 5,104,054 A | 4/1992 | Latham | |
| 5,127,520 A * | 7/1992 | Thomas | 206/303 |
| 5,265,749 A | 11/1993 | Zutler | |
| 5,388,714 A | 2/1995 | Zutler | |
| 5,769,260 A | 6/1998 | Killinger | |
| 5,850,921 A | 12/1998 | Shindou | |
| 6,036,007 A | 3/2000 | Alejandro | |
| 6,184,507 B1 * | 2/2001 | Kouno et al. | 206/303 |
| 6,315,122 B1 | 11/2001 | McCord | |
| 6,474,473 B2 | 11/2002 | Wong | |

* cited by examiner

AIRCRAFT BRAKE ASSEMBLY CONTAINER AND METHOD OF USING SAME

BACKGROUND OF THE INVENTION

1. Field of the Invention

The invention relates to an aircraft brake assembly container, more specifically an aircraft brake assembly container having a variable internal geometry and a method of using the container in securing aircraft brake assemblies, more specifically a method of integrating the container in the method of security the new and used aircraft brake assemblies.

2. Background of the Invention

A unique difficulty exists in the aircraft industry in that frequent maintenance service is required to maintain serviceable vehicles. Maintenance is one of the principal costs in operating airlines, and, therefore, the airline industry and industries similar to it with vehicle fleets are frequently looking for ways to increase productivity in servicing these fleets. In servicing airplanes, airplane brakes frequently require replacement. This type of service requires disassembly of the existing brake assembly from the undercarriage and removal of the assembly, typically requiring wincing or manhandling of the components due to the heavy weight of the components, and then storage and transport of the used assembly. Similarly, during servicing, the new brake assembly must be loaded, moved, winched, and mounted to the undercarriage of the airplane. The packaging of the brake is, therefore, important in facilitating this service. Several configurations of specialized containers have been conceived in the past to address increased productivity in various activities involving shipping containers. However, none has been incorporated into the process of servicing a vehicle fleet, especially an aircraft fleet.

In the search for increased productivity, numerous design improvements in specialized containers have been utilized. Many designs for shipping containers have, in the past, utilized various design elements, for instance mirror image container halves, in attempts to provide for a more convenient container. For instance, U.S. Pat. No. 2,728,581 shows an ammunition transport container with a box structure having two halves each formed of two open-ended sections. Included are rigid cradle-like units 23 as shown in FIG. 2 having a semi-circular seat of a size and shape adapted to accommodate the normally outwardly projecting end of the cylindrical hollow core of the ammunition containers contained in the box. Similarly, several designs have provided containers for cradling delicate materials with inserts for transport. German Patent DE4136268A1 describes a container for transporting and storing wire spools. The container has two halves (1, 21), with two supports guides (3) for supporting the spools and allowing them to be played out with guide bars, as described. In this instance, the structure also facilitates spooling out wire. However, none of these addresses the complexity of aircraft brake assembly servicing and the containers used in this servicing. These designs do not provide for integration of the container as a tool in servicing procedures, much less in servicing aircraft brake assemblies.

Even in the special case of transporting aircraft components, for example, aircraft brake assembly components, there are examples of using specially accommodating containers, such as designs incorporating specially shaped halves. For instance, U.S. Pat. No. 6,036,007, shows a transportation case for heavy objects and provides for accommodating halves, with the top lid and base that are distinct for supporting the brake assembly in a vertical position. The design has two equal portions, a top portion and a mating bottom portion. Additionally, the components are supported by cushions. The bottom portion employs a substantially frusto-conically shaped cushion projecting upwardly therefrom, toward the top portion. The top portion employing a similar frusto-conically shaped cushion projecting downwardly therefrom, toward the bottom portion. The cushions are substantially aligned to hold the brake assembly in a vertical position.

However, no accommodation is made for making the container more useful in the process of servicing the brake assembly. In fact, the vertical orientation is not the orientation utilized in servicing of the brake assembly, as the axle is horizontally oriented. Thus, this design requires additional handling of the brake assembly during removal and installation.

In fact, Applicants own U.S. Pat. No. 5,127,520 to Thomas, et al, utilizes special design elements, in this case identical clamshell halves, for storing and transporting aircraft brake assemblies in support elements. The transport container transports the unit in its preferred vertical orientation, for both a reduced risk of damage to the brake assembly from transport and ease of removing the assembly from the container during servicing. However, this design fails to provide for aspects that allow for the integration of the container into the method of servicing the brake assembly.

Furthermore, several models of these types of containers are required to accommodate the several models of brake assembly. This lack of flexibility necessitates use a wide variety of container sizes and shapes that house a particular brake assembly series or are similarly specific to an aircraft component or series of components. The design specific containers add costs for aircraft maintenance companies and require special accommodations by container manufacturers in manufacturing the specific container lines. This results in frequent line changes to produce the wide varieties of different shapes, sizes, and geometries in these containers, thus driving up costs. Similarly, the failure to integrate the container shape to fit into the method of servicing the aircraft brake increases the time required to perform maintenance, further adding costs.

Increased productivity can be achieved through an improved container that facilitates service methods for brake assembly servicing. Specifically, a brake container that facilitates transport of the brake assembly to the aircraft undercarriage and removal of the used brake all on the axle of the aircraft without the need for additional slinging or wincing or manhandling of the assembly on and off the axle. This would both improve efficiency and, potentially, reduce injuries from manhandling of brake assemblies during servicing. Additionally, this improved container should accommodate a wide variety of brake assemblies, reducing the costs of manufacture of the containers and facilitating easy accommodation of changes in the design and geometry of the brake assemblies.

To date, no container design has been supplied that both aids in removal and in the installation of the brake assembly and provides for the ability to vary internal geometry to accommodate a wide variety of aircraft brake assemblies. Therefore, a need exists for a cost effective aircraft brake assembly container that provides for both durable and stable transport of the brake assembly and ease of use as well as better integration of the container into the maintenance processes of the aircraft. Further, a container is needed that is also flexible enough to accommodate variations in the size, shape, and geometry of existing aircraft and spacecraft brake assemblies and allows for transport of the brake assembly in a horizontal orientation.

SUMMARY OF THE INVENTION

An object of the invention is to provide a durable and stable transport for a brake assembly and that is easy to use and better integrated into the maintenance processes of the aircraft An object of the invention is to provide an aircraft brake assembly container with greater versatility and appeal to aircraft maintenance companies.

A further object of the invention is to provide for a lower manufacturing cost for manufacturing an aircraft brake assembly container capable of accommodating a wide range sizes, shapes, and geometries in aircraft brake assemblies.

A still further object of the invention is to provide a method and a container for use with the method that improves productivity in servicing aircraft.

An object of the invention is to provide an aircraft brake assembly container that is flexible enough to accommodate variations in the size, shape, and geometry of existing aircraft and spacecraft brake assemblies while providing for both durable and stable transport and ease of use in the maintenance processes of the aircraft.

Yet another object of the invention is to provide a method and a container for use with the method that improves productivity in servicing aircraft brake assemblies.

A still further object of the invention is to provide a method of brake assembly installation that utilizes a brake assembly container having a variable internal geometry, a horizontal brake assembly orientation, and provides for storage of the used brake assembly in a more efficient manner.

The invention includes an article of manufacture, an apparatus, a method for making the article, and a method for using the article.

The apparatus of the invention includes a cargo container having at least two identical container portions with at least one of the at least two container portions having an at least one sliding channel therein and an at least one cradle member having an at least one sliding portion engaging with said at least one sliding channel and an at least one seducement device securing the at least two identical container portions.

An at least one cradle member can support the cargo in a horizontal orientation. The cargo container can further have an at least one tab portion that extends from one of said at least two identical container portions and mates with a corresponding at least one void portion. The at least one cradle member can be releasably secured within said container portions. The at least one cradle member can be releasably secured through an at least one post having an at least one bolt bolted within a cutout in the at least one cradle member. The at least one seducement device can be an at least one hinge, latch or pin.

The at least one sliding channel can further comprise a plurality of sliding channels.

The apparatus of the invention further includes an aircraft brake assembly container, having a first container portion of an at least two container portions having an at least one channel therein and releasably securing an at least one cradle member therein with an at least one portion extending from the at least one cradle member to engage and move within said at least one channel; second container portion of an at least two container portions, such that said second container portion forms a mirror image of said first container portion to fittingly engage with said first container portion to form said aircraft brake assembly container; and an at least one seducement device for securing said first portion to said second portion, wherein the at least one cradle member is moved along the respective at least one channel in the at least one container portion to accommodate the aircraft brake assembly.

The second container portion of the at least two container portions can further comprise an at least one channel therein and releasably secure an at least one cradle member therein with an at least one portion extending from the at least one cradle member to engage said at least one channel within the second container portion, wherein the at least one cradle member in each container portion is moved along the respective at least one channel in the respective at least one container portion to accommodate the aircraft brake assembly. The aircraft brake assembly can be accommodated by the at least one cradle member such that the aircraft brake assembly is in a horizontal orientation relative to the container. An at least one tab portion can extend from each of said at least two container portions and mates with a corresponding void portion. The at least one cradle member can be releasably secured within said container portions. The at least one cradle member can be releasably secured through an at least one post having an at least one bolt bolted within a cutout in the at least one cradle member. The at least one seducement device can be an at least one hinge, latch or pin. The at least one channel can be a single channel in each of the portions. The at least one channel can be a plurality of channels. The at least one cradle member can be a plurality of cradle members. The at least cradle member can be generally semi-circular.

The method of the invention includes a method for using an aircraft brake assembly container in replacing an aircraft brake assembly on an aircraft undercarriage including the method steps of transporting an aircraft brake assembly container to said aircraft undercarriage, the container comprising at least two container portions, with a first of the at least two container portions supporting a new brake assembly; opening the container, rotating a second of the at least two container portions; aligning the second of the at least two container portions with the aircraft undercarriage and a used aircraft brake assembly; releasing the used aircraft brake assembly into the second of the at least two container portions; removing the second of the at least two container portions along with the used aircraft brake assembly; aligning the first of the at least two container portions with the aircraft undercarriage; installing the new brake assembly; and replacing the first of the at least two container portions atop the second of the at least two container portions.

The method step of aligning the second of the at least two container portions can further comprise the step of aligning an at least one void portion of the second container portion with the aircraft undercarriage. The step of aligning the second of the at least two container portions can further comprise the method step of coupling said container portion with a brake dolly and using the brake dolly to lift and position the container portion into alignment. The method step of aligning the first of the at least two container portions can further comprise aligning an at least one void portion of the first container portion with the aircraft undercarriage. The step of aligning the first of the at least two container portions can further comprise the method step of coupling said container portion with a brake dolly and using the brake dolly to lift and position the container portion into alignment. The method step of transporting can further comprise the step of transporting the new brake assembly in a horizontal orientation, the method step of aligning can further comprise aligning the brake container horizontally with the used brake assembly, and further comprising the method step of transporting the used brake assembly away from the aircraft in the horizontal orientation.

Moreover, the above objects and advantages of the invention are illustrative, and not exhaustive, of those that can be achieved by the invention. Thus, these and other objects and advantages of the invention will be apparent from the description herein, both as embodied herein and as modified in view of any variations that will be apparent to those skilled in the art.

BRIEF DESCRIPTION OF THE DRAWINGS

Embodiments of the invention are explained in greater detail by way of the drawings, where the same reference numerals refer to the same features.

DETAILED DESCRIPTION OF THE INVENTION

Figure 1:
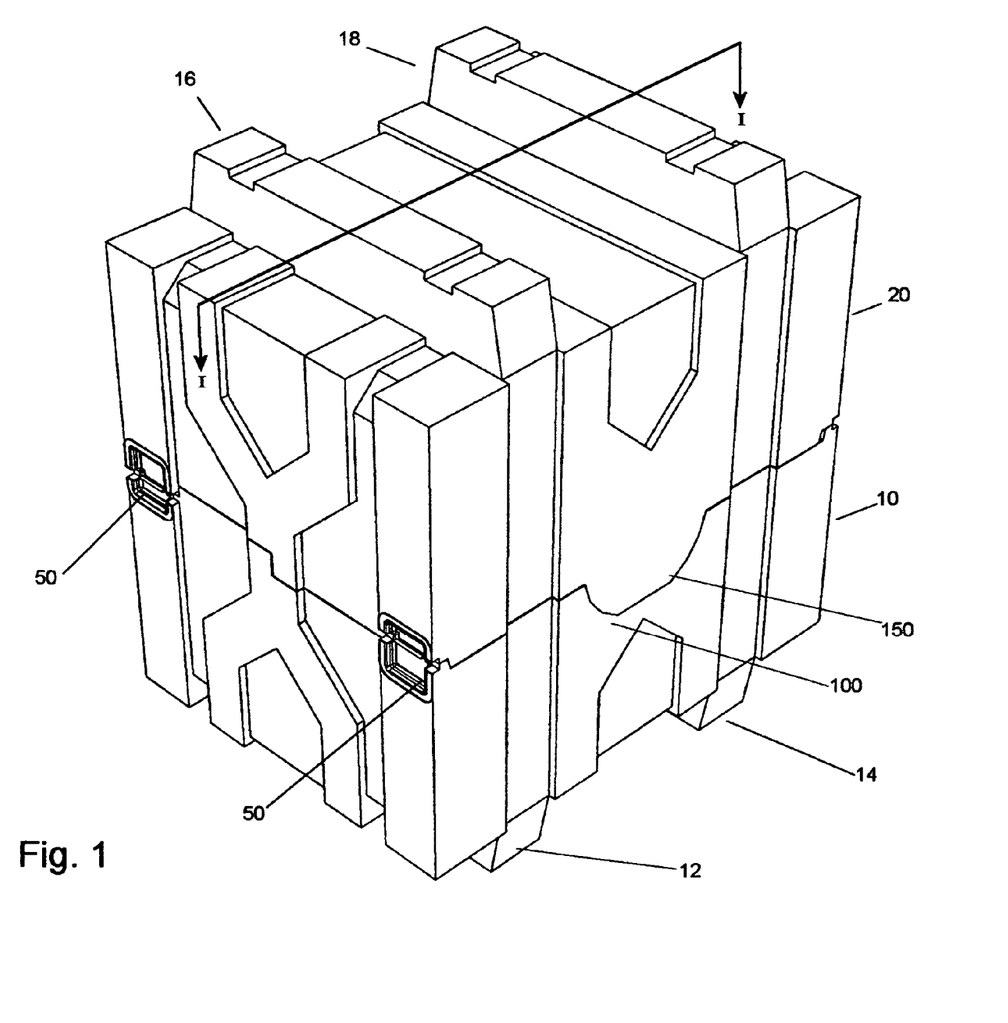
FIG. 1 shows an isometric view of an exemplary embodiment of the instant invention.

FIG. 1 shows an isometric view of an exemplary embodiment of the instant invention. A base or container portion 10, is shown having foot members 12, 14 extending therefrom. An identical base portion 20 is provided and mounted atop base portion 10. Base portion 20 has identical foot members 16, 18. Though reference is made to the two base portions 10, 20 of this exemplary embodiment of the instant invention, further exemplary embodiments of the invention contemplate additional base portions or different configurations of the base portions to suit specific container requirements. The two base portions are secured through an at least one seducement device 50. The at least one seducement device 50 in the exemplary embodiment shown is provided as a plurality of latches spaced about the exterior of the base portions 10, 20, releasably coupling the base portions 10, 20. Additional seducement devices are contemplated, including but not limited to pins, hinges, and the like providing releasably coupling of the at least one base portion.

An at least one tab portion 150 extends from and mates with a matching void portion 100 along at least one side of the container. The matching void portion 100 facilitates entry of the axle of the aircraft undercarriage during maintenance operations. During the aircraft brake servicing, as describe herein below, the base portions 10, 20 are oriented with the axle and the new or used brake assemblies 1, 7, are slid on or off the axle while being cradled by cradle member 30 within the respective base portion 10, 20. In the exemplary embodiment, to facilitate the penetration of the axle, void portion 100 is provided and a tab portion 150 is provided on each of the base portions 10,20. with each of the base portions as mirror images of one another. In further embodiments, variations in the number and placement of these tabs is contemplated to further suit the required uses in servicing aircraft components or in further servicing scenarios.

Figure 2:
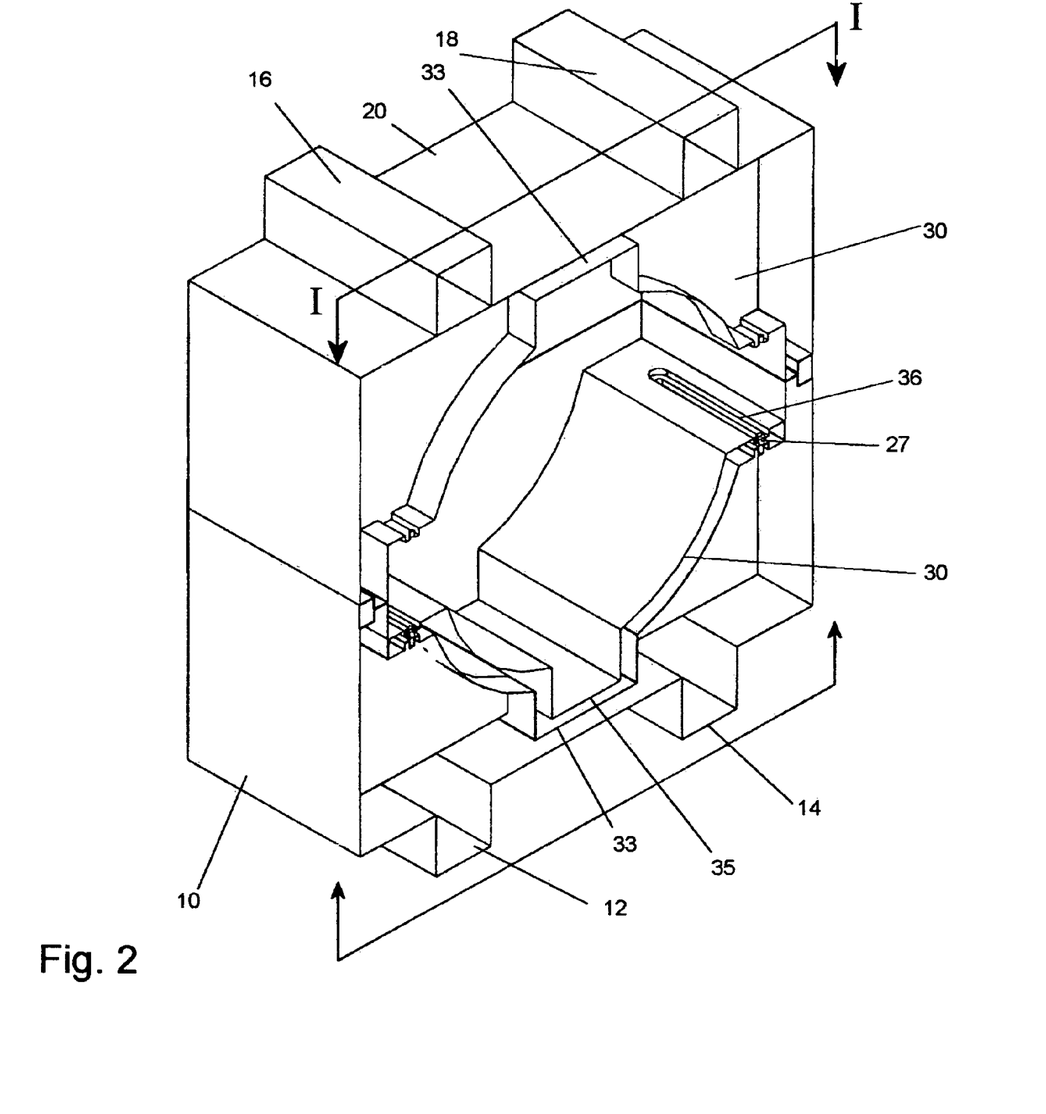
FIG. 2 shows a sectional view of the exemplary embodiment along line I-I.

FIG. 2 shows a sectional view of the exemplary embodiment along line I-I. A cradle member 30, depicted in the exemplary embodiment shown as a semi-circular member, but certainly not limited to this shape, is set within the base portion 10. The cradle member 30 supports brake assembly 1, as best shown in FIGS. 5A-5D, in a horizontal fashion relative to the base portion 10. The base portion 10, in the exemplary embodiment shown in FIG. 2, is provided with an at least one slide channel 33. As shown in the figure, at least one slide channel 33 is located as a single channel within the side of the base portion 10 having foot members 12, 14, extending therefrom. However, it is understood that the at least one sliding channel 33 can be located on any of the walls of the base portion in any geometric configuration, to suit the container and the cargo.

The cradle member 30 is provided with a corresponding sliding portion 35 that fits within the at least one sliding channel 33. The sliding portion 35 is depicted on one side of the cradle member 30. The sliding portion 35 is not limited to this location and can be modified to fit the location of sliding channel 33 within the base portion 10. The sliding portion 35 may also be varied in number, size and shape to suit the desired movement within the at least one sliding channel 33. The ability of cradle member 30 to slide within the container allows for easy adjustment to accommodate orientation of either of the base portions 10,20 during brake assembly servicing relative to the brake assemblies and the axle. This also permits the adjustment of the position of cradle member 30 to accommodate variations in the size and geometry of brake assembly 1.

In the exemplary embodiment shown, the at least one slide channel 33 is oriented along an axis shared with the longitudinal axis of the aircraft brake assembly 1. The at least one sliding channel 33, in this orientation, prevents lateral movement of the cradle, but allows for transverse movement of the cradle 30 within the at least one sliding channel 33. Further exemplary embodiments may provide for variations in the geometry of the at least one sliding channel 33 to provide for both transverse and lateral movement or lateral movement of the cradle 30 with respect to the shared longitudinal axis of the aircraft brake assembly. Again, this facilitates entry of the axle and the orientation of the brake container during servicing.

As described previously, the identical second base portion 20 is provided as a mirror image of base portion 10. The two base portions fitting together to form the transport container, as seen in FIG. 1. Within the second base portion 20 a further cradle member 30 is provided. Similar to the cradle member 30 and first base portion 10, an at least one sliding channel 33 and a sliding portion 35 are provided and the cradle member 30 is both movable within and removable from the second base portion 20 to accommodate the aircraft brake assembly 1.

Figure 3A:
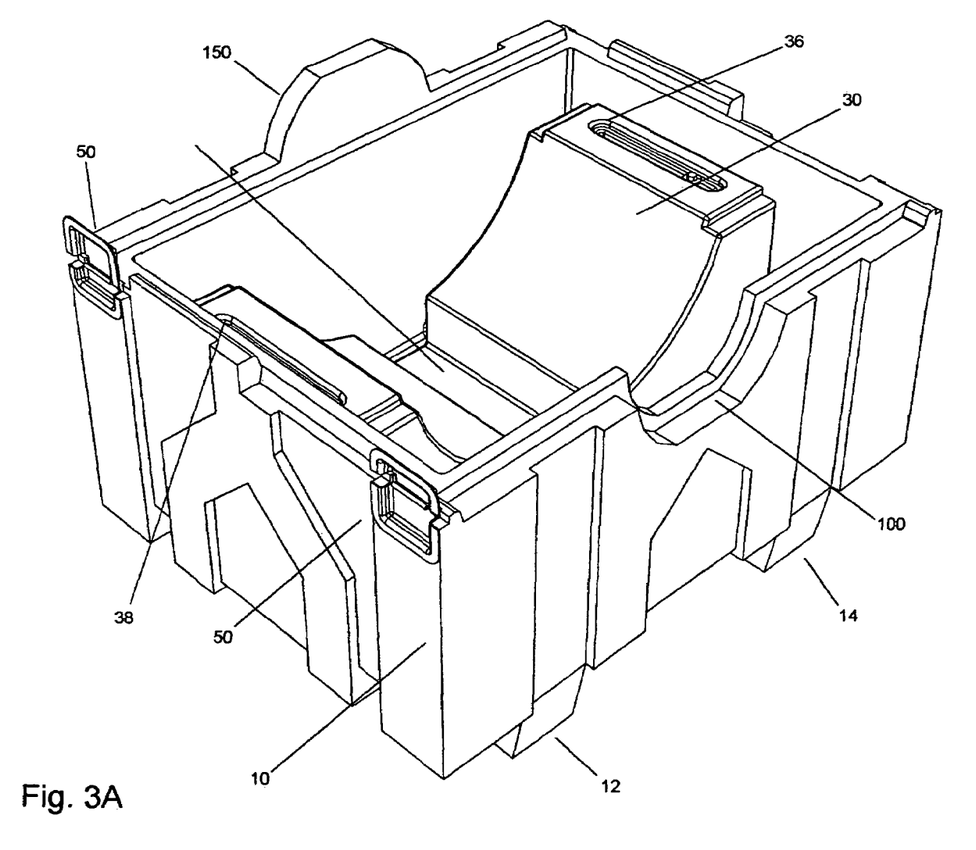
FIG. 3A shows an isometric view of a base portion of the exemplary embodiment with cradle member.

FIG. 3A shows an isometric view of a base portion of the exemplary embodiment with cradle member. Cradle member 30, in the exemplary embodiment shown, is made to be removable, thereby allowing changes in the field of the shape and configuration of the cradle member 30 to fit any variations in the shape of the new or used aircraft brake assembly 1,7 to be transported. The cradle member 30 can be releasably secured within the base portion by any appropriate releasably securing mechanism or method, here shown as a threaded bolt with a nut.

Figure 3B:
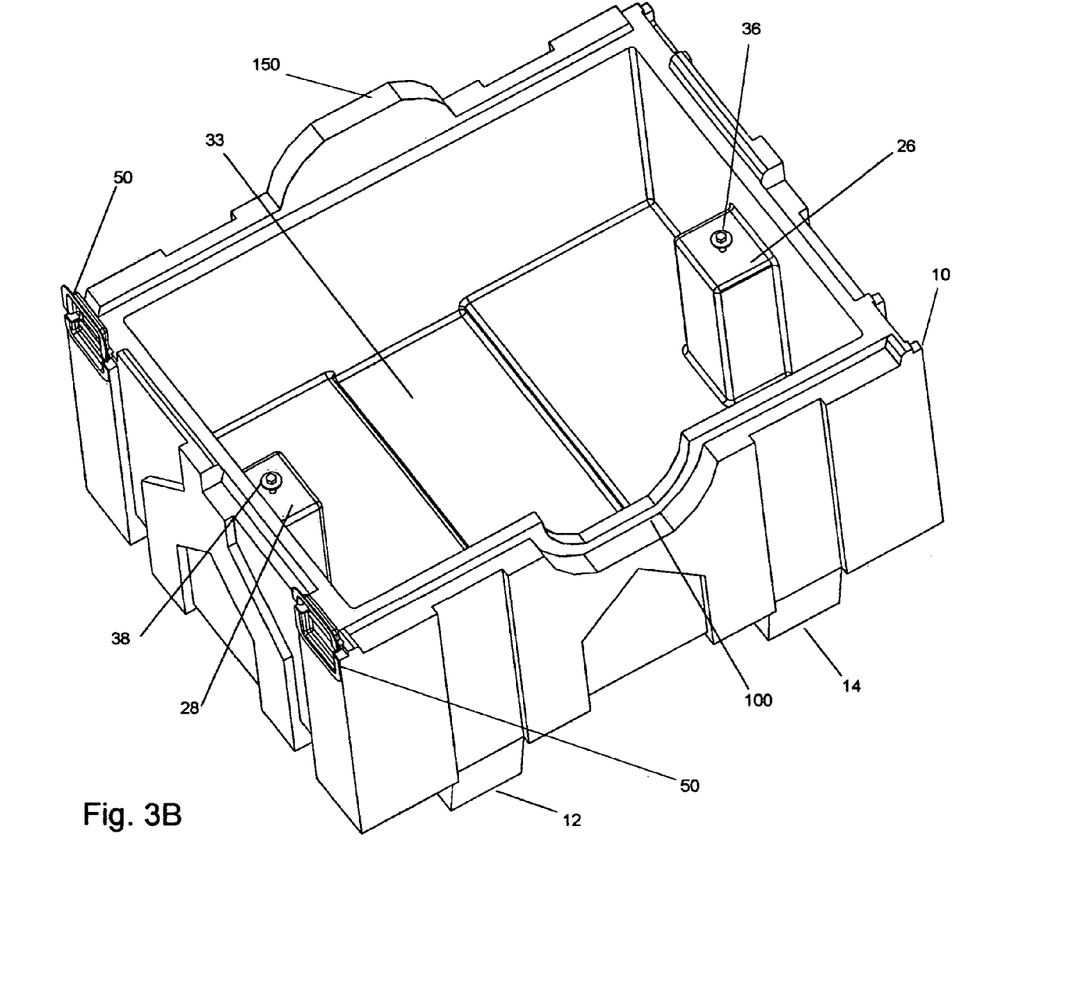
FIG. 3B shows an isometric view of a base portion of the exemplary embodiment without cradle member.
Figure 4:
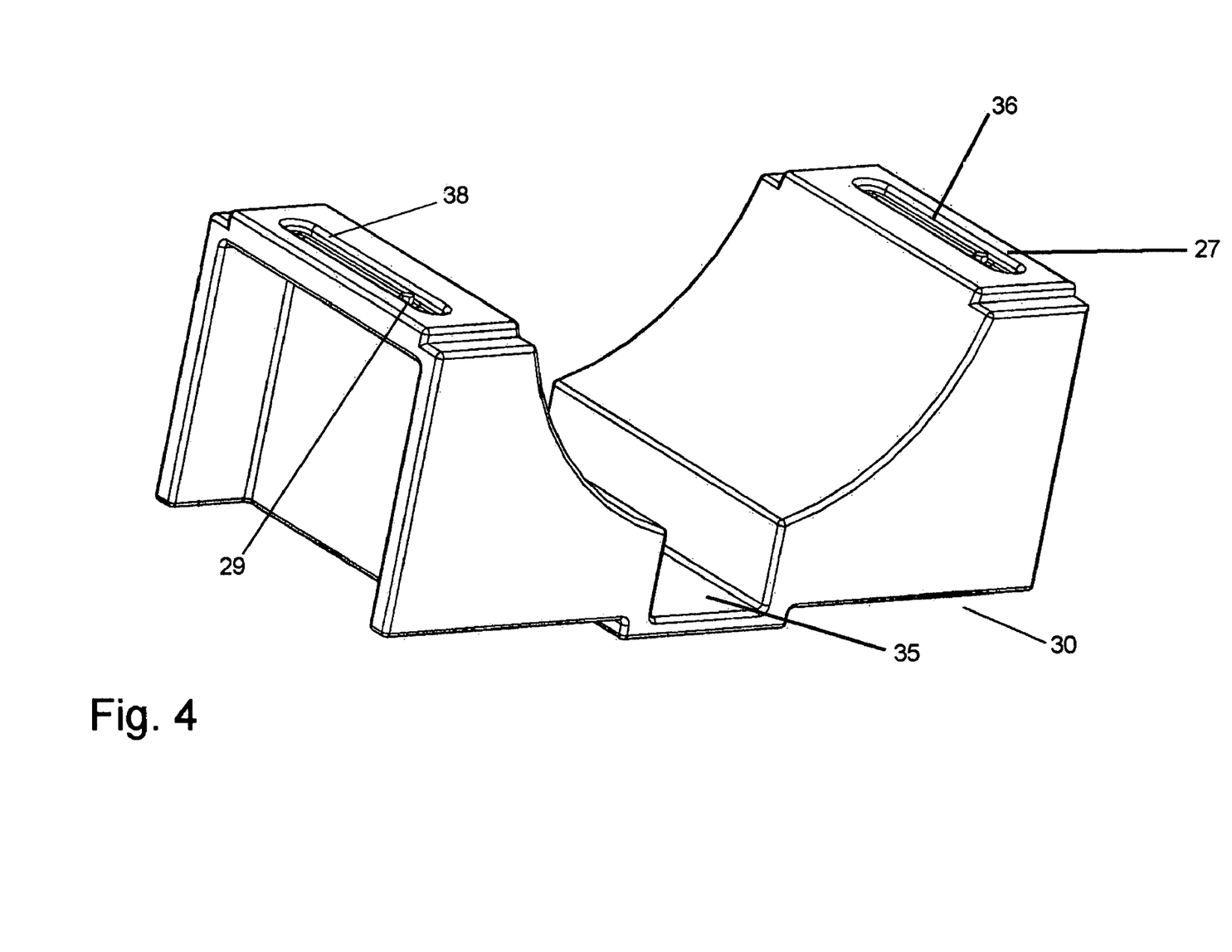
FIG. 4 shows an isometric view of a cradle member of the exemplary embodiment.
Figure 5A:
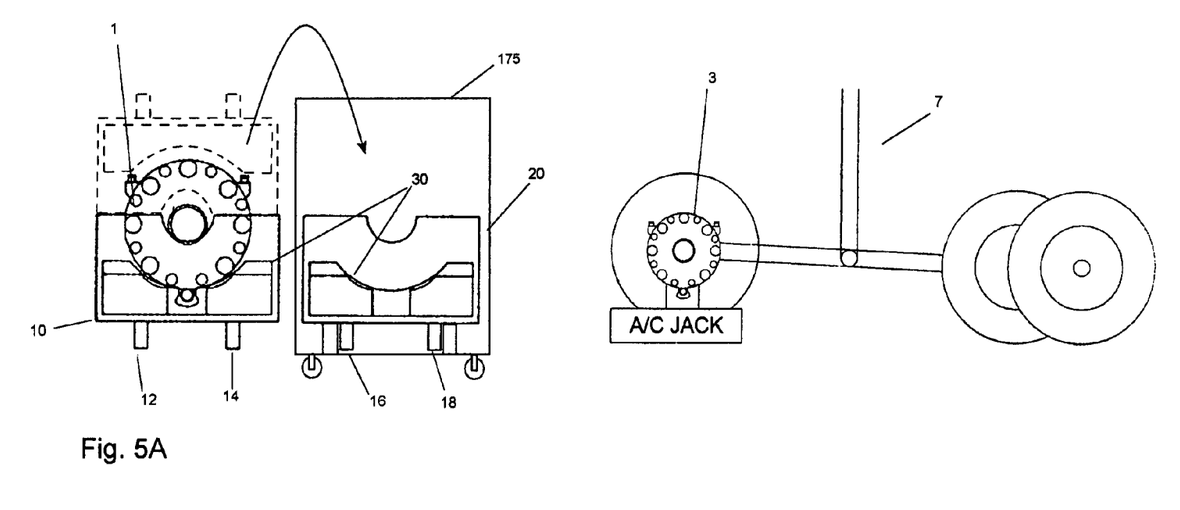
FIGS. 5A-5D are side views of the exemplary embodiment of the invention as deployed during maintenance operations.
Figure 5B:
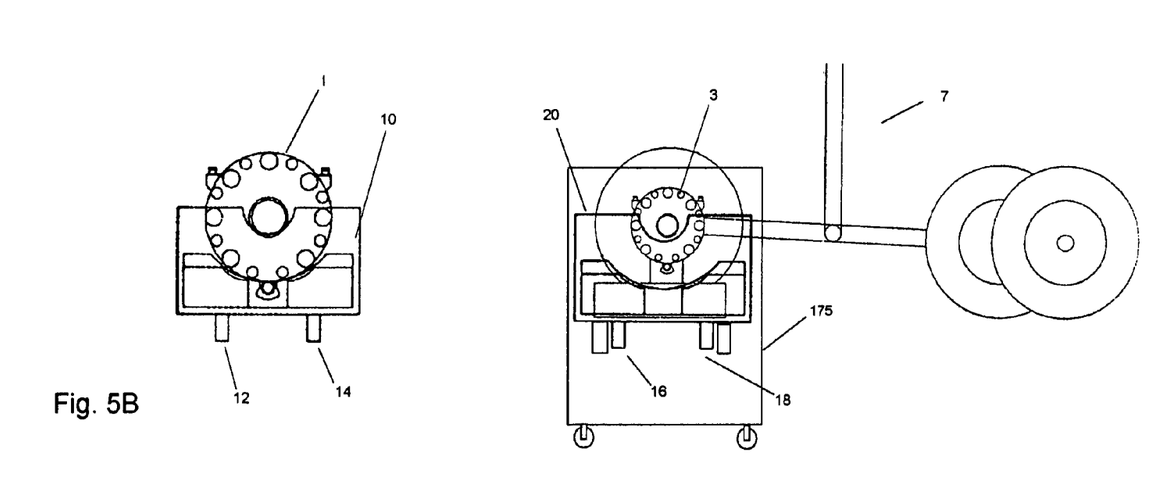
Figures 5C, 5D:
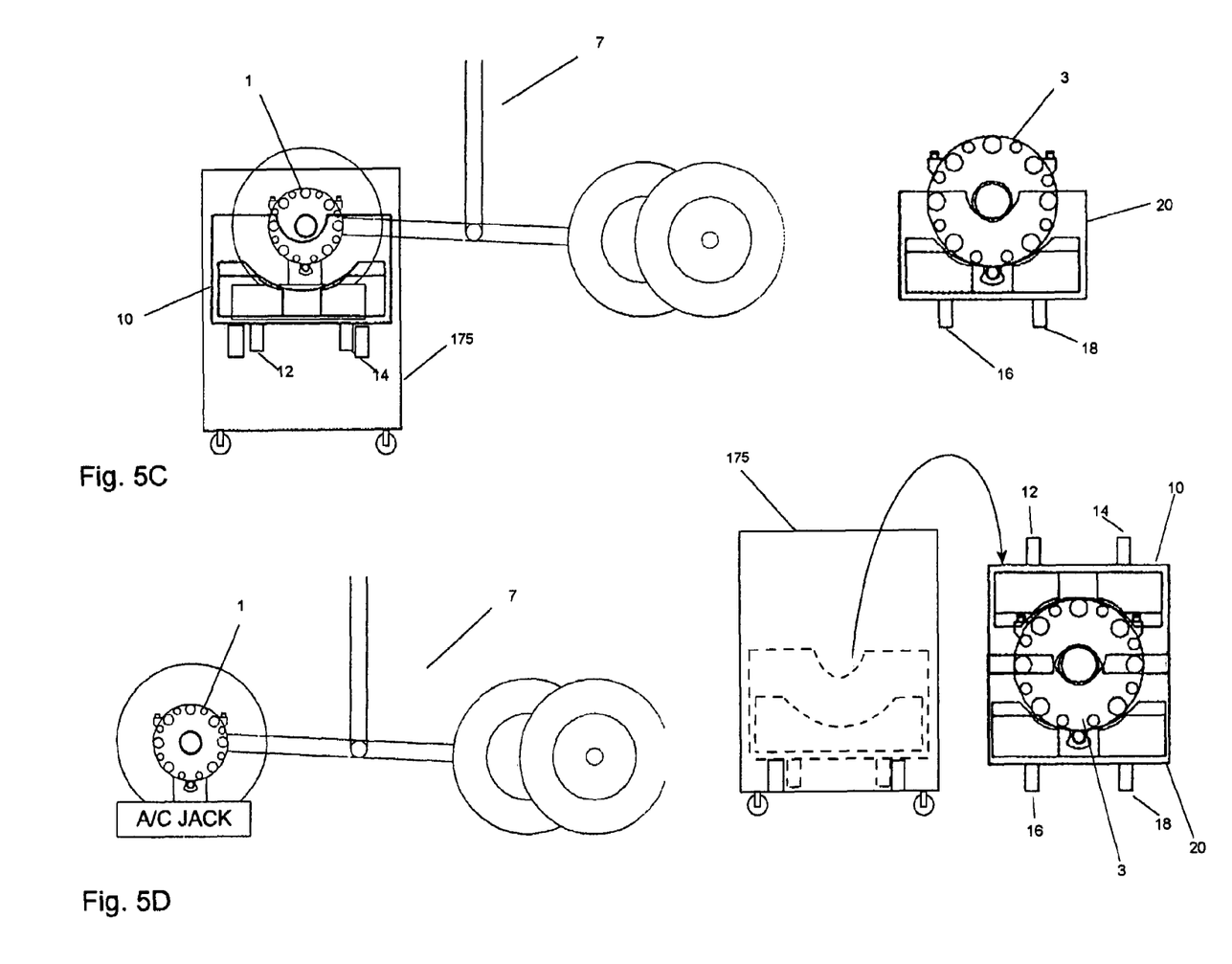

FIG. 3B shows an isometric view of a base portion of the exemplary embodiment without cradle member and FIG. 4 shows an isometric view of a cradle member of the exemplary embodiment. In the exemplary embodiment shown, the cradle member 30 is releasably secured the through post members 26, 28 which are provided with bolts 27, 29 and bolted thereon. The bolts 27, 29 are engaged within slots 36, 38 in the cradle member 30, as more clearly shown in FIGS. 3B and 4. The bolts 27, 29 allow for easy adjustment of the position of cradle member 30 within the at least one sliding channel 33 to accommodate variations in the geometry of aircraft brake assembly 1. Additionally, the bolts 27, 29 may be removed and the cradle member 30 may be replaced by differently sized and shaped members to accommodate an even wider range of geometric configurations of aircraft brake assemblies, as indicated by FIG. 3B.

FIGS. 5A-5D are side views of the exemplary embodiment of the invention as deployed during maintenance operations. The brake container is brought by ground support equipment, such as by a brake dolly, to the aircraft brake undercarriage. In the exemplary embodiment shown, a brake dolly 175 which has a vertical lifting capability is typically used and is shown with respect to the embodiment shown in FIGS. 5A-5D. Variations in the size, shape, and number of brake dollies are contemplated and the use of similar devices is within the spirit of the invention. The new brake assembly 1 rests in a first of the at least one cradle members 30, here within a first base portion 10. A second base portion 20 is removed and rotated 180 degrees about its horizontal axis, so that its feet 16, 18 are oriented in the same direction as those of first base portion 10, as shown. Brake dolly 175 is used to maneuver the second base portion into position. The empty base portion 20 is aligned with the axle the used aircraft brake assembly 7 while on the brake dolly 175. The second base portion 20 allows the axle of the undercarriage mounting the used brake assembly 7 to penetrate the container through the at least one void portion 100 in a side of the base portion 20. Thus, the base portion 20 can be more conveniently located directly under the used break assembly 7 and aircraft undercarriage 3. The position of the cradle member 30 can be adjusted to accommodate the used brake assembly as necessary. The brake dolly 175 is raised to bring the empty base portion 20 into contact with the used brake assembly 7. The cutout or void portion 100 accommodates the axle of the aircraft. The used aircraft brake assembly 7 is released from the aircraft undercarriage. The used brake assembly 7 is then slid into the cradle member 30 in the second container portion 20. This allows the released used brake assembly 3 to be easily slid into the second base portion 20 and lowered in an efficient manner with a minimum risk of injury.

The new aircraft brake assembly 1 is then installed. The first base portion 10 is positioned, either by moving the brake dolly 175 or sliding the container on the brake dolly 175 or its equivalent, so that the axle is positioned to the base portion 10 through the void portion 100. The base portion is slid with the new aircraft brake assembly 1, being cradled by cradle member 30, onto the axle. The new aircraft brake assembly 1 is fastened onto the axle. The first container portion 10 is then removed. In this instance, the brake dolly 175 is lowered with the now empty first base portion 10. Alternatively, the brake dolly 175 can be lowered with the first portion 10 and the second portion 20 thereon or a similar method for removal can be utilized. The empty base portion 10 with cradle member 30 is then rotated 180 degrees, the cradle member 30 being adjusted to accommodate the used aircraft brake assembly 7. Base portion 10 is then affixed atop base portion 20 and the container is closed and prepared for shipment for disposal or refurbishment of the used brake assembly 7.

The embodiments and examples discussed herein are non-limiting examples. The invention is described in detail with respect to exemplary embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. An aircraft brake assembly container containing an aircraft brake assembly, comprising:
    an aircraft brake assembly;
    a first container portion of an at least two container portions having an at least one channel therein and releasably securing an at least one cradle member therein with an at least one portion extending from the at least one cradle member to engage and move within said at least one channel, the at least one portion also supporting the aircraft brake assembly within an interior cavity formed by the first container portion;
    a second container portion of an at least two container portions, such that said second container portion forms a mirror image of said first container portion to fittingly engage with said first container portion to form said aircraft brake assembly container, the second container portion of an at least two container portions completing the interior cavity and surrounding the aircraft brake assembly to securely contain the aircraft brake assembly therein;
    wherein the at least one cradle member is releasably secured within said container portions and is releasably secured through an at least one post having an at least one bolt bolted within a slot in the at least one cradle member, said slot being completely enclosed at its periphery by said cradle member;

an at least one securement device for securing said first portion to said second portion, wherein the at least one cradle member is moved along the respective at least one channel in the at least one container portion to accommodate the aircraft brake assembly wherein the aircraft brake assembly is accommodated by the at least one cradle member such that the aircraft brake assembly is in a horizontal orientation relative to the container; and an at least one void portion is provided on at least one of the at least two container portions, wherein the void portion penetrates through an at least one wall of the container and allows an aircraft undercarriage or brake axle to penetrate the container and engage the aircraft brake assembly without removing the aircraft brake assembly from the at least one portion supporting the aircraft brake assembly.

2. The aircraft brake assembly container of claim 1, wherein the second container portion of the at least two container portions further comprises an at least one channel therein and releasably secures an at least one cradle member therein with an at least one portion extending from the at least one cradle member to engage said at least one channel within the second container portion, wherein the at least one cradle member in each container portion is moved along the respective at least one channel in the respective at least one container portion to accommodate the aircraft brake assembly.

3. The aircraft brake assembly container of claim 1, wherein an at least one tab portion extends from each of said at least two container portions and mates with a corresponding void portion.

4. The aircraft brake assembly container of claim 1, wherein the at least one securement device is an at least one hinge, latch or pin.

5. The aircraft brake assembly container of claim 1, wherein the at least one channel is a single channel in each of the portions.

6. The aircraft brake assembly container of claim 1, wherein the at least one channel is plurality of channels.

7. The aircraft brake assembly container of claim 1, wherein the at least one cradle member is multiple of cradle members.

8. The aircraft brake assembly container of claim 1, wherein the at least cradle member is generally semi-circular.

* * * * *